(12) United States Patent
Bosloy et al.

(10) Patent No.: US 7,895,158 B2
(45) Date of Patent: Feb. 22, 2011

(54) DATA LOGGING IN CONTENT ROUTED NETWORKS

(75) Inventors: Jonathan Bosloy, Kanata (CA); Peter Ashton, Nepean (CA); Christopher Whalen, Ottawa (CA); Shawn McAllister, Manotick (CA); Craig Betts, Kanata (CA); Daniel Fossum, Ottawa (CA); David Horton, Ottawa (CA); Peter Manson, Nepean (CA)

(73) Assignee: Solace Systems Inc., Ottawa, ON (CA)

( * ) Notice: Subject to any disclaimer, the term of this patent is extended or adjusted under 35 U.S.C. 154(b) by 172 days.

(21) Appl. No.: 11/312,380

(22) Filed: Dec. 21, 2005

(65) Prior Publication Data

US 2006/0149788 A1 Jul. 6, 2006

Related U.S. Application Data

(60) Provisional application No. 60/638,389, filed on Dec. 27, 2004.

(51) Int. Cl.
*G06F 7/00* (2006.01)
*G06F 17/00* (2006.01)
*G06F 17/30* (2006.01)
*G06F 15/173* (2006.01)

(52) U.S. Cl. .................. 707/633; 707/758; 707/966; 709/238

(58) Field of Classification Search .................... 707/10
See application file for complete search history.

(56) References Cited

U.S. PATENT DOCUMENTS

| 5,974,417 | A * | 10/1999 | Bracho et al. ............. 707/10 |
| 6,405,191 | B1 | 6/2002 | Bhatt et al. |
| 6,665,672 | B2 * | 12/2003 | Myers et al. .............. 707/10 |
| 6,928,471 | B2 * | 8/2005 | Pabari et al. ............. 709/223 |
| 7,228,304 | B1 * | 6/2007 | Wong et al. ............... 707/10 |
| 7,283,463 | B2 * | 10/2007 | Miller et al. ............. 370/216 |
| 7,617,328 | B2 * | 11/2009 | Lewis et al. ............. 709/246 |
| 2001/0032263 | A1 * | 10/2001 | Gopal et al. ............. 709/227 |
| 2003/0009463 | A1 * | 1/2003 | Gallant .................. 707/10 |
| 2003/0128991 | A1 * | 7/2003 | Carling et al. ............ 399/8 |
| 2003/0195946 | A1 * | 10/2003 | Yang .................... 709/219 |
| 2003/0210694 | A1 | 11/2003 | Jayaraman et al. |
| 2004/0001498 | A1 * | 1/2004 | Chen et al. .............. 370/401 |

(Continued)

FOREIGN PATENT DOCUMENTS

WO 03/098485 A2 11/2003

OTHER PUBLICATIONS

A Scalable Protocol for Content-Based Routing in Overlay Networks, R. Chand, P.A. Institut EURECOM 06904 Sophia Antipolis, France, Network Computing and Application 2003 NCA 2003 Second IEEE International Symposium, pp. 123-130, Apr. 18, 2003.

*Primary Examiner*—Mohammad Ali
*Assistant Examiner*—Griselle Corbo
(74) *Attorney, Agent, or Firm*—Marks & Clerk; Richard J. Mitchell (57) ABSTRACT

A method of managing a content routed network, involves distributing published documents through said network for delivery to subscribers; maintaining data logs pertaining to said published documents at different points in the network; and correlating the data logs to obtain information about the operation of the network.

42 Claims, 6 Drawing Sheets

U.S. PATENT DOCUMENTS

| | | | |
|---|---|---|---|
| 2004/0059789 A1* | 3/2004 | Shum | 709/206 |
| 2005/0086469 A1* | 4/2005 | Dunagan et al. | 713/163 |
| 2005/0223021 A1* | 10/2005 | Batra et al. | 707/102 |
| 2006/0004767 A1* | 1/2006 | Diaconu et al. | 707/10 |
| 2006/0129650 A1* | 6/2006 | Ho et al. | 709/207 |

* cited by examiner

```
                                    ┌─ 97
         ┌<ingRec num="1234">        ┌─ 83
  81 ─┘        ┌─<time>2004-12-13T14:12:15.123Z</time>
         82 ─┘  ┌─<docId>3c00a8cc-1771-4998-9756-469339294557</docId>
         84 ─┘ ┌─<size>80</size>      85 ─┘
         86 ─┘ ┌─<pri>3</pri>     ┌─ 94
         87 ─┘ ┌─<userData>12345</userData>
         93 ─┘ ┌─<user>SolaceSystems</user>  ─ 89
         88 ─┘ ┌─<security>SSL/TLS</security>
         79 ─┘ ┌─<actionTaken action="discarded" reason="discard filter matched" reasonCode="5"/>
         90 ─┘              ┌─ 91      ┌─ 92      ┌─ 95         ┌─ 96              ┌─ 98       ┌─ 99
         </ingRec>
                                  80
```

Fig. 4

```
         <egRec num="1235">
101 ─┐    <time>2004-12-13T14:12:15.123Z</time>      ── 114
    102 ─┐ <docId>3c60a8cc-1771-4998-9756-469339294557</docId>
    103 ─┐ <size>80</size>
    104 ─┐ <pri>3</pri>
    105 ─┐ <userData>12345</userData>
    106 ─┐ <user>jjohnson</user>      ── 108
    107 ─┐ <security>SSL/TLS</security>
    119 ─┐ <actionTaken action="dropped" reason="no subscriber entitlements" reasonCode="9"
    109 ─┘           └─ 110  └─ 111          └─ 112                        └─ 113
                    ack="false"/>
         </egRec>                       ── 118
                          100
```

Fig. 5

```
         <?xml version='1.0'?>           ── 136
121 ─┐   <trafficLog schemaVersion='1'>
    122 ─┐ <start>              130 ──┐
        126 ─┐ <hostname>content-router-1</hostname>
        127 ─┐ <ip>10.10.10.1</ip>        ── 131      ── 132
        128 ─┐ <radiusDomain>pubsub.solacesystems.com</radiusDomain>
        129 ─┐ <time>2004-12-13T14:12:15.123Z</time>
              </start>                              ── 133
    123 ─┐ <ingRec num="1236">
              ...
              </ingRec>
    124 ─┐ <egRec num="1237">
              ...
              </egRec>
    125 ─┐ <end>
        126 ─┐ <hostname>content-router-1</hostname>
        127 ─┐ <ip>10.10.10.1</ip>
        128 ─┐ <radiusDomain>pubsub.solacesystems.com</radiusDomain>
        134 ─┐ <time>2004-12-13T15:12:15.123Z</time>
              </end>                               ── 135
         </traffic-Log>
                          120
```

Fig. 6

| | 140 | |
|---|---|---|
| Publisher ID (141) | Xpath Expression (142) | Data Logging Code (143) |
| 71 | /cXML//OrderRequestHeader//Money[text()>100] | 10 |
| 71 | /cXML//OrderRequestHeader | 20 |
| 71 | /cXML//StatusUpdateRequest | statusUpdateRequest |
| 72 | /cXML//OrderRequestHeader//Money[text()>200] | 10 |
| 72 | /cXML/Request/SupplierDataRequest | 20 |
| * | /newsML | 15 |
| * | /nitf | 100 |

Fig. 7

| | 160 | |
|---|---|---|
| Subscriber ID (161) | Xpath Expression (162) | Data Logging Code (163) |
| 91 | /cXML//OrderRequestHeader//Money[text()>100] | 10 |
| 91 | /cXML//OrderRequestHeader | 20 |
| 91 | /cXML//StatusUpdateRequest | statusUpdateRequest |
| 92 | /cXML//OrderRequestHeader//Money[text()>200] | 10 |
| 92 | /cXML/Request/SupplierDataRequest | 20 |
| * | /newsML | 15 |
| * | /nitf | 100 |

Fig. 8

```
               <subscriptionRec num="1238">
201                  <time>2004-12-13T14:12:15.123Z</time>
      202            <user>jjohnson</user>
      203            <subscription xmlns:sol="www.sol.com" xmlns:foo="www.foo.com"
      204                          xpe="/sol:x/foo:y"/>
                                                          205              206
212                  <isFilter>false</isFilter>
208                  <code>12345</Code>              207
209                  <actionTaken action="added"/>
211                  <result>OK</result>
                                              210
               </subscriptionRec>
```

```
               <summaryIngRec num="1239">
221                  <time>2004-12-13T14:12:15.123Z</time>
      222            <intervalDuration>900</intervalDuration>
      223
      227            <user>SolaceSystems</user>           224
      235            <security>SSL/TLS</security>
      228            <actionTaken action="forwarded" count=2342 size="90356"/>
      229            <actionTaken action="discarded=" reason="congestion" reasonCode="10"
                                       230                   233                    234
                                 count=3 size="1000"/>
               </summaryIngRec>       231      225
                                 232        226
```

```
    /<summaryEgRec num="1239">
271
    272 /<time>2004-12-13T14:12:15.123Z</time>
    273 /<intervalDuration>900</intervalDuration>
    277 /<user>jjohnson</user>
    285 /<security>SSL/TLS</security>
    278 /<actionTaken action="delivered" count=3000 size="101456"/>
    279 /<actionTaken action="discarded=" reason="congestion" reasonCode="10"
                          280                  283                 284
                      count=1 size="450"/>
</summaryEgRec >         281    275
                         282    276
                           270
```

DATA LOGGING IN CONTENT ROUTED NETWORKS

CROSS REFERENCE TO RELATED APPLICATION

This applications claims the benefit under 35 USC 119(e) of prior U.S. provisional application No. 60/638,389, filed Dec. 27, 2004, the contents of which are herein incorporated by reference.

FIELD OF THE INVENTION

This invention relates to content-routed networks, and in particular to a method of data logging in content-routed networks.

BACKGROUND OF THE INVENTION

Content-based networks are described in A Carzaniga, M. J. Rutherford, A. L. Wolf, A routing scheme for content-based networking, Department of Computer Science, University of Colorado, June 2003, the contents of which are incorporated herein by reference.

In content routed networks, a publish/subscribe data communication is provided; wherein publishers can inject content into the network, and subscribers can subscribe to content from the network. The publishers and subscribers do not require knowledge of each other.

Figure 1:
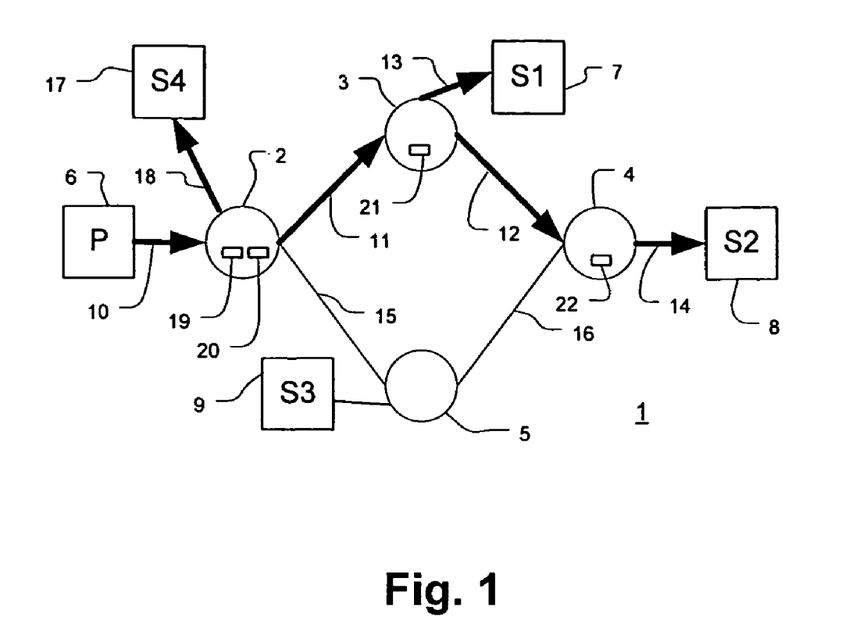
FIG. 1 shows an example content routed network.

FIG. 1 depicts an example content-routed network 1, which consists of a plurality of content routers 2, 3, 4, and 5 interconnected by links 11, 12, 15 and 16; a publisher 6 (note that a content routed network typically will have a plurality of publishers but only one is shown in FIG. 1); a plurality of subscribers 7, 8, 9 and 17 (note that a content routed network can contain a large number of subscribers, i.e. millions). A publisher is a computer or user that can insert content into the network. A subscriber is a computer or user who has expressed interest in some specific content. Publisher 6 publishes a document into the content routed network by sending it over link 10 to content router 2. Content router 2 matches the content of the received document against the subscriptions for the network, which the router learned of through a content routing protocol (refer to co-filed application Ser. No. 11/012,113, the contents of which are incorporated herein by reference) or by some other means. Content router 2 determines that the document is required by a local subscriber on content router 2, and one or more subscribers on content router 3 and content router 4, but not by any subscribers on content router 5. As a result, a single copy of the document is sent over link 11 to content router 3, since link 11 is the preferred path to content routers 3 and 4 in this example. In addition, a copy of the document is sent over link 18 to local subscriber 17. Content router 3 delivers the document to all local subscribers which have matching subscriptions, which in this case is subscriber 7. So, a copy of the document is sent over link 13 to subscriber 7. In addition, the document is forwarded on to content router 4 over link 12. In a similar manner, content router 4 delivers the document to any local subscribers with matching subscriptions, which in this case is subscriber 8. Thus, the document is sent over link 14 to subscriber 8. Content router 4 also determines that no further content routers require a copy of the document. For full details of the content routing protocol-used, reference is made to U.S. patent application Ser. No. 11/012,113.

When content routing techniques are applied to the wide area network, such as being deployed in a service provider network, new capabilities are required as opposed to deployment scenarios within an enterprise (known as an Enterprise Service Bus; ESB). A service provider, such as a regional, national or international telecommunication provider, can provide network-resident content routing capability to provide an Extended Enterprise Service Bus (EESB). Such a deployment introduces new requirements onto the content-routed network, such as the requirement to provide data logging facilities for the purpose of billing, performance monitoring, troubleshooting, and security logging. Note also that data collection is also useful for content routing within an enterprise, for example, to be able to bill various departments of the enterprise based on network usage, or to troubleshoot problems, etc.

SUMMARY OF THE INVENTION

According to the present invention there is provided a method of managing a content routed network, comprising distributing published documents through said network for delivery to subscribers; storing data logs pertaining to said published documents at different points in the network; and correlating said data logs stored at said different points to obtain information about the operation of said network.

It will be understood that the term document is used in the most general sense in this application and includes any entity containing content, including multimedia content, capable of being published and delivered to subscribers. Another term for document is message.

Embodiments of the invention can provide the capability to be able to provide flexible billing schemes within a content routed network, such as billing a publisher based on the quantity of documents published or the volume of data published, billing a subscriber based on the quantity of documents received or the volume of data received; billing a publisher based on the quantity of documents or volume of data delivered to subscribers in the content routed network, the capability to bill based on the type of document being published or delivered, etc.

Embodiments of the invention can provide the capability to measure quality of service within the content routed network, such as the latency of document delivery from the time of publishing to the time of delivery. Latency can also be measured across the group of subscribers receiving a particular document to ensure that delivery across the group of subscribers is fair. For example, for the dissemination of real-time data such as stock quotes, each subscriber should receive the information within a bounded amount of time of each other, as dictated by a service level agreement.

Embodiments of the invention can provide the capability required to be able to prove or audit delivery of documents to subscribers in order to demonstrate lossless delivery within a specified service level agreement (SLA), for example.

Embodiments of the invention can provide the capability to log events, such as lack of document delivery, document rejection due to encoding or formatting errors, rejected documents due to lack of entitlement, etc. in order to provide measurement of such events and to provide data logs for troubleshooting.

Embodiments of the invention can also provide data logging of documents being published and delivered, including a correlation of which published documents have been delivered to which subscribers, for security logs.

Embodiments of the invention can also provide data logging to track "self serve" publisher/subscriber activity for the purposes of billing or troubleshooting. Logging information about subscribers adding or deleting subscriptions or filters is an example of this type of "self serve" activity.

Embodiments of the invention allow logging information for each document published to be correlated with separate records recorded elsewhere in the network for each document delivered. A per-document network-wide unique tag (preferentially globally unique) may used for correlating publish and delivery records. Documents may be timestamped at the publishing point in the network, and this time output in the publishing record; similarly, timestamping and outputting a record at each delivery point (requires use of synchronized networks clocks such as from NTP). This provides the ability to correlate publish and subscriber records (via the unique tag above), and then use the timestamps to determine the delivery latency for each subscriber, and among the set of subscribers. This can be used for service-level agreement monitoring.

Embodiments of the invention can offer the ability to bill on volume of data published, number of documents published (to the publisher), volume of data or number of bytes received (billable to the end subscriber, or to the publisher, or both), in addition to time of day-billing structures etc. Also, records can be output for error conditions, such as documents rejected due to XML errors, firewall restrictions, etc., and integrated into an overall data collection system.

Embodiments of the invention offer control over what data is output. Also, it is possible just to output summary data on a timed basis, such as 15-minute aggregate records for very high-volume conditions such as market data. In that case, a hybrid method can be employed such that some small % of documents still also have a detailed record emitted at publishing points and each delivery point such that latency can be measured on a sampled basis.

It is possible to control whether to output a record and the type of record to output based on the configuration of filters (Xpath Expressions (XME) in the case of XML networks) that, when matched, triggers the emission of a data logging record of a certain type. This can be used to override the default logging (e.g. summary) depending on the document content.

The ability to include information in the logging record based on the content of the document, as indicated by a content match (using an XPE in the case of XML networks).

Embodiments of the invention allow the publisher to supply a parameter that is logged by router ("userData"). This tag is carried thru the network and delivered to the subscriber. This allows correlation of publisher, router and subscriber logs to validate end-to-end delivery of the document, as well as network latency calculation.

Since embodiments of the invention employ a generic XML-encoded capture mechanism, the ability to capture other "events" in the network such as subscription add/delete activity on a per-sub basis when subscriber-self-serve is supported.

A distinction is made between the time that a document could have been delivered to a subscriber (i.e. when it was available for delivery), vs. the time when it was actually delivered so it is possible to differentiate between the two events when a document cannot be delivered right away to a subscriber (e.g. when a subscriber is offline).

The "code" associated with a subscription that he has registered (in addition to using the code in the log records) may also be provided to the subscriber.

In another aspect the invention provides a content routed network comprising a plurality of content routers, each content router comprising a central processing unit; a first memory portion storing programs and data; and a second memory portion storing log records of published content passing through the content router.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENT

In example content routed network 1 of FIG. 1, data logs are produced for each published document. For example, for each document published into network 1 by publisher 6, the ingress content router 2 produces an ingress data record 19 to record relevant information about the document being published. Similarly, data logs are produced for each document sent to a subscriber. In network 1, when an egress content router, such as 3, delivers a document to subscriber 7, content router 3 produces an egress data record 21 to record relevant information about the delivered document. Similarly, content router 4 produces an egress data record 22 to record relevant information about the document delivered to subscriber 8, and content router 2 produces an egress data record 20 to record relevant information about the document delivered to subscriber 17. Correlation data is provided in the ingress data records 19 and egress data records 20, 21 and 22 such that it can be determined which subscribers, if any, received a given published document. In addition, the publisher can optionally provide its own opaque data along with the document, which is logged in both the ingress record 19 and egress data records 20, 21 and 22 for the document.

Figure 2:
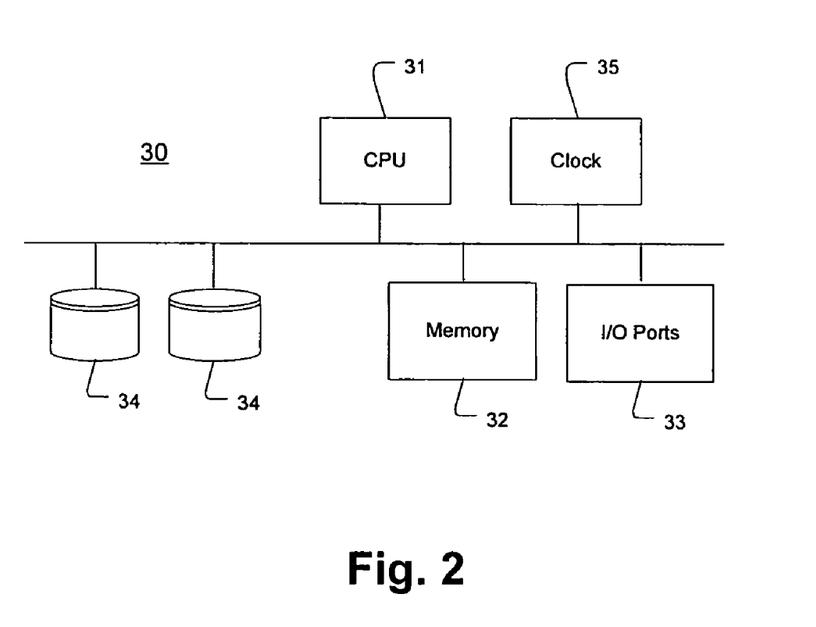
FIG. 2 shows a content router.

FIG. 2 shows a content router 30. The content router consists of one (or more) processors (central processing unit—CPU) 31; a memory 32 (to hold programs and data, as well as to buffer documents being processed); input/output (I/O) ports 33 through which the content router can communicate with publishers, subscribers, other content routers, and management systems; a real-time clock 35 which holds the date and time, preferentially with a millisecond or better accuracy and resolution; and data storage devices in the form of a plurality of disk drives 34 which are used to hold the data log records being produced, as well as configuration information used to control operation of the data logging operation. Note that the disks 34 are preferentially configured in a redundant configuration (RAID), as is known in the art. The I/O ports can utilize various technologies, such as Gigabit Ethernet, 10 Gigabit Ethernet, SONET, etc.

Figure 3:
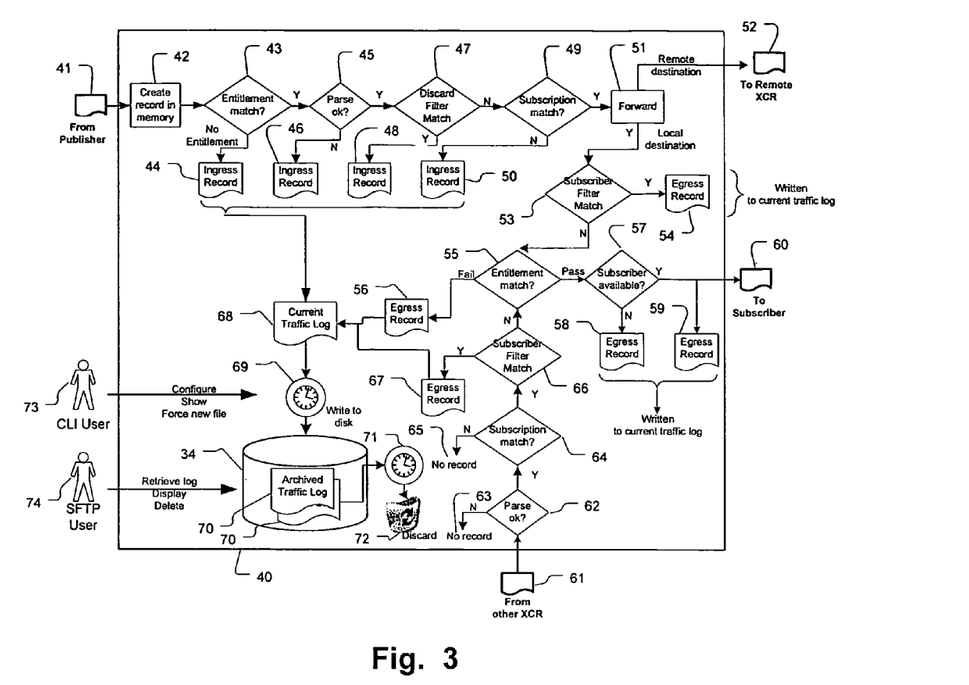
FIG. 3 shows data logging processing.

FIG. 3 shows an example processing flow 40 carried out by a content router for a document 41 sent to the content routed network from a publisher (for example, in FIG. 1, when publisher 6 publishes a document over link 10 to content router 2). In step 42, a record is created in memory to contain information which will be required for the log to be created. This includes information such as: the identification of the publisher of the published document 41; the date and time of document 41 arrival (determined from clock 35, accurate to a fraction of a second, such as millisecond resolution or even finer resolution); the size of the document 41 in bytes; the priority of the document 41 (for a description of document priority and document quality of service, refer to co-filed patent application Ser. No. 11/182,756, the contents of which are incorporated herein by reference); a unique identifier for the document 41; etc.

At step 43, a check is made to see if the publisher is entitled to publish documents into the network; if not an ingress record is produced at step 44 to indicate that the document 41 was not processed any further due to a lack of publisher entitlement.

At step 45, a check is made to see if the published document 41 was successfully parsed. For example, for Extensible Markup Language (XML) published documents, a check is made to ensure that the XML document is well-formed, and optionally whether it conforms to an expected Document Type Definition (DTD) or XML schema. For a description of XML, refer to "Extensible Markup Language (XML) 1.1", W3C Recommendation 15 Apr. 2004, W3C, the contents of which are herein incorporated by reference. If the parsing checks do not pass, an ingress record is produced at step 46 to indicate that the published document 41 was not processed any further due to a parsing error.

At step 47, a check is made to see if the published document 41 matches any discard filter rules. These rules are applied against each published document to see if the published document should be discarded. Such rules can be used as firewall checks, for example, to block published content that contains malicious or banned content. The rules can be applied on a per-publisher basis and/or against all publishers. For published documents which are XML, a preferred language to express the filtering rules is XPath Expressions (XPE), which can be used to match the structure and content of XML documents. For a description of XPath, refer to "XML Path Language (XPath) Version 1.0", W3C Recommendation 16 Nov. 1999, World Wide Web Consortium (W3C), the contents of which are herein incorporated by reference. Should the published document be blocked by a filter rule, an ingress record is produced at step 48 to indicate that the published document 41 was not processed any further due to a matching discard filter. Note that the ingress record can also optionally contain details on which discard filter rule(s) caused the published document to be discarded, such as by providing the discard filter XPE or XPEs that were matched.

At step 49, a check is made to see if the published document 41 matches any subscriptions in the network (local to the content router, or on a remote content router). The subscription matching table is populated by having the content router receive subscription registrations from local subscribers, and through the use of a content routing protocol to discover the subscriptions from other content routers in the network. Refer to Ser. No. 11/012,113 for more details. For XML documents, XPath expressions are the preferred manner for expressing subscriptions. If no subscriptions match, then an ingress record is produced at step 50 to indicate that the published document 41 was not processed any further since it did not match any subscriptions in the network.

At step 51, the published document is forwarded to any remote destinations (i.e. other contents routers) which require a copy of the document to satisfy their local subscriptions. Note that there may be zero or more of such destinations. A copy 52 of the published document is sent over one or more links to reach the required content routers in the network. Reference is made to Ser. No. 11/012,113 for the manner in which this is done. It should be noted that only a single copy of the document is sent over a link between content routers, and that copy may be used by one or more content routers as described above. Additionally, step 53 is reached if the subscriptions of one or more local subscribers to the content router were matched. There may be zero or more such local subscribers whose subscriptions were matched. At step 53, a check is made for each matched local subscriber to see if any subscriber filter rules have been matched. Each subscriber may optionally have one or more filter rules which, if matched against a published document, indicate that the subscriber is not to receive that published document, even if one or more subscriptions for that subscriber also match the published document. For XML documents, XPath expressions are preferentially used to express subscriber filters. If a subscriber with a matching subscription is also found to have a filter match, an egress record is produced at step 54 for that subscriber to indicate that that subscriber is not receiving a published document due to a subscriber filter match. Note that this egress record can also optionally contain details on which subscriber filter rule(s) caused the published document to be not delivered to that subscriber, such as by providing the subscriber filter XPE or XPEs that were matched. Note that for egress records, each subscriber is treated independently. If one subscriber is not delivered a document due to a subscriber filter match, other subscribers with matching subscriptions can still be delivered the document.

At step 55, a check is made, independently for each subscriber, whether the subscriber is entitled to receive the published document 41, based on the entitlements of the publisher and the entitlements of the subscriber; if not an egress record is produced at step 56 to indicate that the document 41 was not delivered to the subscriber due to an entitlement mismatch. Entitlements allow a content routed network to provide control over which subscribers can receive published documents from which publishers, and to provide virtual private content routed networks over a shared content routing infrastructure. Reference is made to co-filed patent application Ser. No. 11/012,168, the contents of which are incorporated herein by reference, for more information on entitlements.

At step 57, a check is made to see if the subscriber is currently available. Note that a subscriber may be unavailable due to situations such as the subscriber system being offline. If the subscriber is not currently available, an egress record is produced at step 58 to indicate that the document 41 was not currently delivered to the subscriber due to connection setup error to the subscriber. This record is produced so that a record is available that the document would have been delivered to the subscriber if the subscriber had been available. Note that the document can be queued and delivered to the subscriber when it is later available.

When a copy 60 of a published document is delivered to a subscriber, an egress record 59 is produced. This includes the timestamp (including date and time, with a resolution of 1 millisecond or better) of when the delivery occurred. Thus, the time of delivery of each document to each subscriber is recorded. Note that if a subscriber was not available and an egress record was produced at step 58, a separate egress record is produced at step 59, with a separate timestamp, when the document is subsequently delivered. Thus, the time when the delivery could have first been done had the subscriber been available, and the time of eventual delivery, is separately recorded in two separate egress records.

When a content router receives a published document 61 from another content-router (for example, content router 3 receives a document from content router 2 over link 11), the document is processed as follows. At step 62, a check is made to see if the document was parsed successfully. If not, step 63 is reached and processing of the document stops. Note that at step 63 no record is produced since any document parsing problem should have been detected in step 45 at the content router which first received the published document from the publisher. The data logs are associated either with a publisher or a subscriber, and this situation reflects a corruption of a document between content routers. Another form of a log, such as an event log, should be issued by the content router in this situation to debug this problem. Note that a data log could instead be produced at step 63.

At step 64, a check is made to see if the received document 61 matches any local subscriptions. In the preferred content routing method described in Ser. No. 11/012,113, when a content router receives a document from another content router, only a comparison against local subscriptions must be performed. Note that as described in Ser. No. 11/012,113, when a document is received over an inter-area link, further subscription matching processing must be performed relating to matching both local subscriptions and network subscriptions other than those from the area from which the document came, but this is not shown. At step 64, if there is no match against subscriptions, then step 65 is reached and processing of the document stops without producing a data log. Note that this situation can occur when one or more subscriptions are removed from a content router as documents are in progress in the network, such that when a document reaches a content router it no longer has a matching subscription. Also, if non-perfect covering sets are utilized, as described in Ser. No. 11/012,113, a content router may receive a document for which it has no matching subscriptions. Note that FIG. 3 only shows the processing of the document for the purpose of data logging. The document may also be routed onwards to other content routers as explained above and in Ser. No. 11/012,113; this logic is omitted in FIG. 3 for clarity.

At step 66, a check is made for subscriber filter matches. This logic has already been described above for step 53. If a document is not delivered to a given subscriber due to a subscriber filter, then an egress record is produced at step 67, with the same logic as described above for step 54. Note that each subscriber with matching subscriptions is treated independently. Control then reaches step 55, as described above.

When ingress and egress records are produced, they are written to the current traffic logging file 68 (stored on disk(s) 34 of FIG. 2). The current traffic logging file 68 is closed when its size reaches a configurable threshold, or when a configurable amount of time elapses (shown in step 69) or for some other reason such as the number of records in the file has exceeded a configurable threshold. This allows this set of records to be available for transfer off of the content router to an external system for processing. The size limit and/or record limit is made configurable since if a large amount of records are being produced, this keeps each record file to a manageable size. The time limit controls when this set of records is made available to external systems. For example, the file size could be limited to 2 Gigabytes, and the time limit can be set to one hour. Note that in FIG. 3, records are added to the current traffic log 68 at each point that an ingress or egress record is produced, such as at steps 44, 46, 48, 50, 54, 56, 58, 59, and 67. Note also that current records are regularly flushed to disk (vs. being held in memory) to ensure that records are not lost if the content router should crash or lose power. The preferred format for the content of data logging files is XML. Note that other formats could instead be utilized, such as fixed binary records, comma-separated values, etc.

The disk 34 contains a plurality of archived traffic log files 70, which are available for use by external administrators of the content router, or external systems (such as a data analysis system or a billing system). The administrator or external system (73 and 74) can carry out actions on the archived traffic log files, such as retrieving the log file (via a method such as Secure File Transfer Protocol (SFTP)), and can carry out other actions such as displaying the contents of a log file, deleting log files, etc. The content router can optionally be configured to send available log files to an external SFTP server automatically (to a specified IP address, port number and logging in with a specified user name and password). Additionally, when the content router is automatically-transferring the traffic log files to an external server, the files can optionally be automatically removed from the content router once successfully transferred. The content router also monitors the amount of disk space available, and can remove old files if necessary to make room for new log files when disk space is running below a configurable threshold. In addition, at step 71, the content router can automatically delete (step 72) archived log files older than a configurable threshold, such as 30 days.

The log files 70 may be optionally stored in a compressed format on disk 34 in order to save space on the disk. In addition, this saves bandwidth when the archived log files 70 are transferred to an external system. A compressed scheme such as "gzip" or other methods known in the art can be used for the compression (and later decompression) of the log files 70.

The parameters of the data logging system, such as the configurable parameters described above, can be set by the administrator 73 of the content router through a management interface, such as a Command Line Interface-(CLI), or via another management interface such as Simple Network Management Protocol (SNMP), as is known in the art. Status of the data logging system can also be queried, as well as actions such as listing the available archived traffic files, showing their dates and times, deleting archived files, etc.

Figure 12:
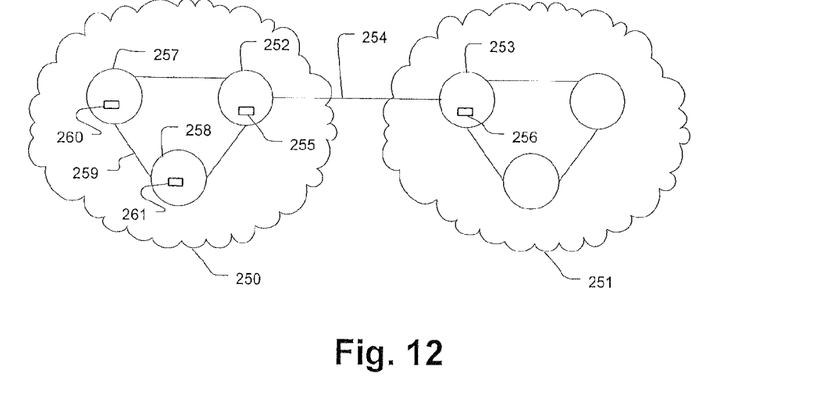
FIG. 12 shows data logging between networks of different administrative domains.

Referring to FIG. 12, when content routing occurs between different networks 250 and 251 belonging to different administrative domains, it is also beneficial to carry out data logging at the network boundary point (i.e. at content routers 252 and 253 for traffic crossing the link 254 which connects the two networks 250 and 251). For example, when a document is leaving a network 250 controlled by one administrative domain and entering network 251 controlled by a different administrative domain, an egress record 255 can be produced by content router 252 in a manner similar to the egress record which is produced for delivery to a subscriber. The egress record 255 produced can indicate the identity of the content-routed network 251 to which the document is being sent into, as opposed to the identity of a subscriber. Similarly, on ingress to a content-routed network 251 from another content-routed network 250, an ingress record 256 can be produced by content router 253 in a manner similar to the ingress record that is produced when a document is received from a publisher. The ingress record 256 produced can indicate the identity of the content-routed network 250 from which the document is being received from, as opposed to the identity of a publisher. This can allow the tracking of traffic between content-routed networks 250 and 251 under different administrative control, and can be used to allow the network operators to bill each other, debug network problems, etc. Note that such records could also optionally be produced at the interfaces between content routers within the same content routed network for debugging purposes. For example, consider a document being sent from content router 257 to content router 258 over link 259 on its way towards other points in the same network 250 or different network 251. Content router 257 can produce an egress record 260 indicating the identity of the content router 258 to which the document is being sent to. Note that if a document is forwarded to multiple content routers, then multiple egress records would be produced. Content router 258 can produce an ingress record 261 indicating the identity of the content router 257 from which the document is received.

Figure 4:
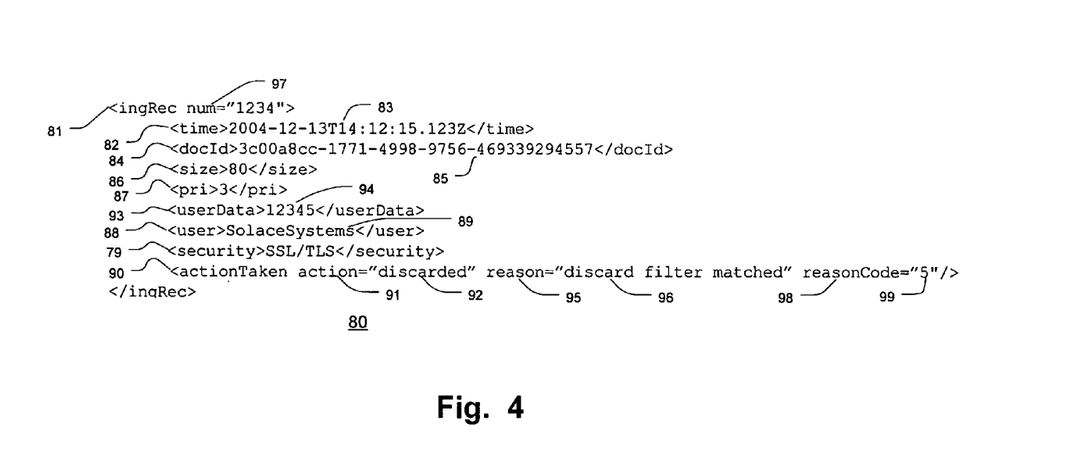
FIG. 4 shows an example ingress record.

FIG. 4 shows an example ingress record 80, which is preferentially formatted using XML. The "ingRec" field 81 identifies this record as an ingress record. The "ingRec" field 81 has an attribute "num" 97 which provides a unique record sequence number, which is unique across all records produced (of any type) and across the log files produced. The record sequence number increases sequentially (i.e. the first record may be an ingress record with sequence number 1, and the next record in the same-file or in a subsequent file may be an egress record with sequence number 2). This allows an external application which is processing the logs to detect if any records have been missed or lost. For example, if an entire log file is lost, the record sequence number field 97 will allow the number of missing records to be determined. Note that all record types have the "num" field 97. The "time" field 82 carries the timestamp 83 for the ingress record (i.e. the date/time of receipt of the document from the publisher), which is preferentially formatted as YYYY-MM-DDTHH:MM:SS.SSSZ, where: YYYY is the year, MM is the month (numeric in the range of 1 to 12), DD is the day of the month (1 to 31), HH is the hour of the day (in the range of 0 to 23), MM is the minute of the hour (0 to 59), SS.SSS is the second to 1 millisecond resolution (000.00 to 59.999), and Z indicates zulu time or universal coordinated time. The "docId" field 84 carries a unique document id 85 assigned from the content router when a document is first received from a publisher. This document id is generated in such a way as to be guaranteed unique in the content-routed network, and preferentially globally unique. For example, the document id 85 could be composed of a unique identifier for the content router, followed by a unique document serial number assigned by that content router. Or, the document id 85 can be a Universal Unique Identifier (UUID) as is known in the art. The document id 85 is a key piece of information as it is used to correlate ingress and egress data records in the content routed network. This allows the data logging system to track the disposition of each of each published document. The "size" field 86 carries the size of the document in bytes. The "pri" field 87 carries the document priority. The "user" field 88 carries the user name or other identifier of the publisher associated with the ingress record 80, such as the example publisher user name of "SolaceSystems" 89. The "security" field 79 carries an indication of whether a secure connection or a non-secure connection was used to receive the document from the publisher 88. The value can be "SSL/TLS" to indicate delivery over a secure connection, or "none" to indicate the use of a non-secure connection. Field "security" 79 is optional, and if absent, a non-secure connection is indicated. The optional "userData" field 93 carries optional opaque user data provided by the publisher along with the published document. For example, the opaque user data 94 is the string "12345". The content router does not interpret this value nor check for its uniqueness. This allows opaque data provided by the document publisher to appear in data logs associated with the document. This could be a unique identifier generated by the publisher for the document, so that there is a common name or handle for the document which can be matched in the data logs, in association with the "user" 88 (publisher) to find the disposition of the document by the content routed network. The "actionTaken" field 90 carries an attribute "action" 91 which indicates the action taken on the document, such as the example action "discarded" 92. In addition, the optional attribute "reason" 95 can be used to contain further details on the "action" 91, such as a reason of "discard filter matched" 96. This indicates that the published document was dropped by the content router due to match against a discard filter rule. Also, the optional attribute "reasonCode" 98 provides a numeric code 99 for the reason string 96, such as a code of "5". This allows the system processing the ingress record 80 to make determinations on a reasonCode numeric value 99 instead of a reason string value 96. Table 1 below provides example action 91, reason 95 and reasonCode 98 values for an ingress record 80.

TABLE 1

Ingress Record 80 fields action 91, reason 95 and reasonCode 98

| action 91 | reason 95 | reasonCode 98 | Condition |
|---|---|---|---|
| "forwarded" | | | The document was forwarded for delivery. The optional "reason" and "reasonCode" attributes are not specified under this condition. |
| "discarded" | "document too large" | "1" | Document was too large for the router to handle and had a correct content-length (incorrect length leads to an "xml error" reason) |
| | "no publisher entitlements" | "4" | The publisher did not have an entitlement to publish the document. |
| | "xml error" | "3" | During the parse of the document, there was an error in the XML of the document, or an internal limit was reached (such a the maximum number of attributes supported for a single XML element). |
| | "discard filter matched" | "5" | The document matched a discard filter rule. |
| | "no subscriptions matched" | "6" | The document does not match any subscriptions in the content router. |
| | "internal error" | "7" | An internal error occurred which prevented the router from property processing the document. |
| | "congestion" | "10" | The document could not be processed due to a congestion condition within the router. |
| | "zero-length document" | "2" | The document was of zero length. |

Figure 5:
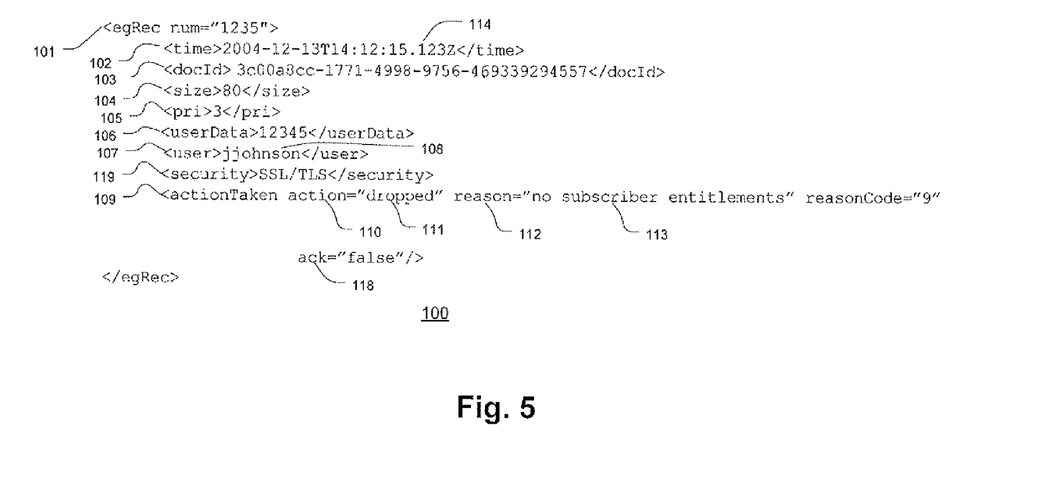
FIG. 5 shows an example egress record.

FIG. 5 shows an example egress record 100, which is preferentially formatted using XML. The "egRec" tag 101 identifies this record as an egress record. The "time" tag 102 carries the timestamp 114 for the egress record (i.e. the date/time of the action being carried out, such as discarding the document or delivering it to the specified subscriber), which is preferentially formatted as described above for field 83. The "docId" field 103 carries the unique document id which was assigned to the document as described above for field 84. The "size" field 104, "pri" field 105, and optional "userData" field 106 are as per described above for the ingress data record 80. Note that the "size" field 104 reflects the document size upon delivery to the subscriber, and this may be different than the value in the ingress record for the document if the document was transformed before delivery. Similarly, the "pri" field 105 could have a different value than the ingress record 80 if the priority was modified due to rules associated with the destination subscriber. The "security" field 119 carries an indication of whether a secure connection or a non-secure connection was used to deliver the document to subscriber 107, with the same values as described above for field 79. The "user" field 107 contains the subscriber identity value 108, indicating which subscriber is involved with the egress record 100. The "actionTaken" field 109 contains an "action" attribute 110, with a value such as "discarded" 111, and an optional "reason" attribute 112 with an example value such as "no_entitlement" 113, to indicate the disposition of the document with respect to the subscriber indicated by 108.

The "actionTaken" field 109 also contains an optional attribute "ack" 118 with a value of "true" or "false". This indicates whether the subscriber 107 acknowledged delivery of the document. This attribute would normally only be present when the action 110 has a value of "delivered", and it is still optional since it is assumed to have a value of "true" for a delivered document if the field 118 is not present. The field "ack" 118 allows a egress record 100 to be output when a document is attempted to be delivered to a subscriber but no acknowledgement is received. The content router does not know if the subscriber successfully received the document or not (the subscriber may have received and processed the document, but crashed before an acknowledgement can be sent). If the document is subsequently re-delivered later and acknowledged by the subscriber, a new egress log for the same user 107 and docId 103 can be generated, indicating the new time 102 of delivery, and that the "actionTaken" 109 was "delivered" with "ack" 118 indicating "true".

Note that if a document cannot be immediately delivered to a subscriber, then an egress record 100 can be generated to indicate that the document was available for delivery but not yet delivered. For example, if the connection to the subscriber is down when a document arrives, an egress-record 100 can be generated with the time 102 indicating when the document was available for delivery, and the actionTaken field 109 can indicate the reason that the document was not yet delivered. In this way, the latency of the document through the network can be determined even though it could not be delivered to the specified subscriber 107. If the document is queued for later delivery, then when the document is subsequently delivered, a second egress record 100 for the same user 107 and docId 103 is generated, indicating that the document was successfully delivered and acknowledged. Thus, if a document is delayed in delivery, the cause of the delay being an off-line subscriber vs. latency delays in the network can be determined through analysis of the egress records 100.

Note that the "UserData" field 106 is optionally sent between content routers, such as when a document is sent over link 11 from content router 2 to content router 3. Since ingress and egress records can be correlated as described above using the "DocumentId" 84 and 103, the UserData can be associated with each egresss record 101 based on the ingress record 81 via the "DocumentId" field 84 and 103. However, an advantage of sending the "UserData" along with the document is that it can be optionally delivered to each subscriber receiving the published document. This allows the publisher to send opaque data associated with the document to each subscriber receiving the document. A preferred method for associating meta-data with a document in a content-routed network is described Ser. No. 11/012,168. This meta-data approach is used to carry other associated data along with the document, such as document identifier, priority, etc. Table 2 below provides example action 110 and reason 112 values for an egress record 100.

TABLE 2

Egress Record 100 fields action 110, reason 112 and reasonCode 116

| action 110 | reason 112 | reasonCode 116 | Condition |
|---|---|---|---|
| "delivery" | | | The document was delivered to the subscriber. |
| "discarded" | "no subscriber entitlements" | "9" | The subscriber does not have entitlements which intersect with the document's entitlements. |
| | "subscriber filter matched" | "8" | The document matches a subscriber filter XPath expression associated with the given subscriber. |
| | "connection error" | "11" | The subscriber was not immediately available when a delivery attempt was made. |
| | "secure delivery; unsecured client" | "13" | The subscriber is configured for secure delivery, but the subscriber registered as unsecured subscriber. |
| | "unsecured delivery; secure client" | "14" | The subscriber is configured for unsecured delivery, but the subscriber registered as a secure subscriber. |
| | "internal error" | "7" | An internal error occurred which prevented the router from properly processing the document. |
| | "congestion" | "10" | The document could not be processed due to a congestion condition within the router. |

Figure 6:
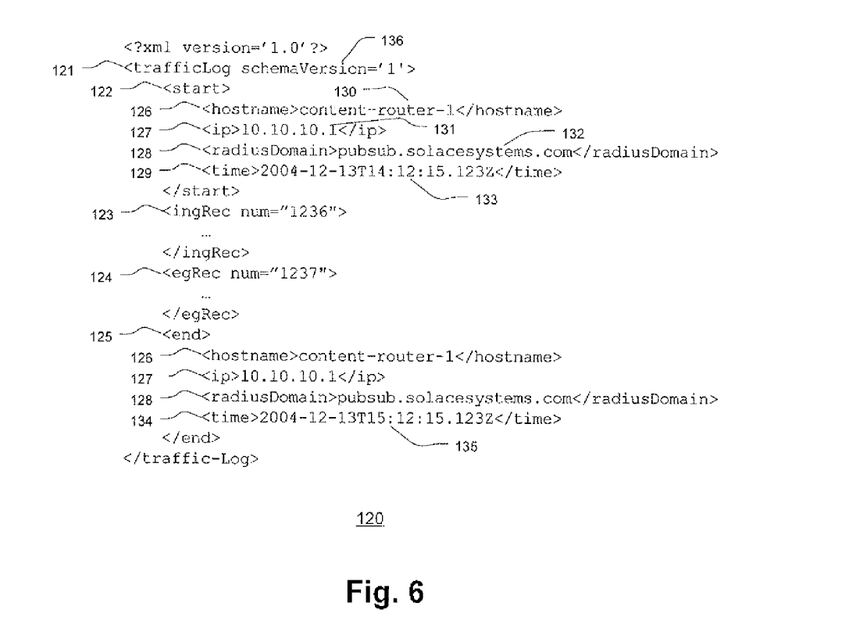
FIG. 6 shows an example traffic log file.

FIG. 6 shows an example traffic logging file 120, preferentially encoded using XML. The field "trafficLog" 121 indicates that the file contains traffic log information, and provides an optional "schemaVersion 136 indicating the version of the schema used for the file. The file starts with a "start" record 122, then contains zero or more "ingRec" 123 and zero or more "egRec" 124 (the details of which have been explained above), with the ingress records 123 and the egress records 124 being intermingled. Note that other record types could also appear in the file interspersed with "ingRec" 123 and "egRec" 124 as explained below to log other events. At the end of the traffic log 120 is an "end" record 125. The start record 122 and the end record 125 each contain four fields: "hostname" 126, "ip" 127, "radiusDomain" 128, and "time" (129 in "start" record 122; 134 in "end" record 125). The "hostname" field 126 carries the host name of the content router which produced the traffic log file; an example being the hostname of "content-router-1" 130. The "IP" field 127 carries the IP address of the content router which produced the traffic log file; an example being the IP version 4 IP address of "10.10.10.1" 131 (note that other address formats such as IP version 6 can be used). The "radiusDomain" field 128 carries the domain associated with the "user" 88 and 107. This allows the domain name for a large number of publisher and subscriber user names to only be specified once. For example, in the user name example of "jjohnson" 108 and the "radiusDomain" 128 example of "pubsub.solacesystems.com" 132, the full user name with the domain name applied would be jjohnsongpubsub.solacesystems.com. Note that the "user" 88 and/or 107 could carry the domain name directly, in which case the "radiusDomain" 128 would not be applied. In a "start" record 122, the "time" field 129 carries the timestamp of the date/time where the traffic log file 120 started to hold records. The start timestamp 133 is formatted in the manner described above. In an "end" record 125, the "time" 134 contains the timestamp of the date/time when the traffic log file 120 was completed. The timestamp value 135 is formatted as described above.

In the content routed network 1, the various content routers, such as 2, 3, 4 and 5 should have their internal clocks 35 synchronized in an accurate manner, such as accurate to within a millisecond or better. One method of doing this is to use the Network Time Protocol (NTP); refer to RFC 1305, "Network Time Protocol (Version 3) Specification, Implementation and Analysis", March 1992, The Internet Society, the contents of which are incorporated herein by reference. Accurate clock synchronization is required in order to be able to measure the latency of a published document traversing the content-routed network from a publisher to a given subscriber by subtracting the timestamp 114 in the egress record 100 from the timestamp 83 in the ingress record 80; where the egress and ingress record relate to the same document as determined by matching "docId" values 85 and 115. In addition, for a given document delivered to a plurality of subscribers, the timestamp values of the various egress records 100 pertaining to the same document ID can be compared to determine the difference in delivery times among the subscribers.

An extension to the data collection method described above is to add additional data collection filters to allow the content of published documents to be reflected in the ingress records and egress records produced. This allows a further flexible means of identifying the type of content, and can be used in the billing algorithm for publishers and subscribers. This can be accomplished by allowing a configuration of one or more ingress data logging filters and egress data logging filters to be configured on each content router. Each ingress and egress data logging filter is preferentially encoded as an XPath expression when used in a network that is content routing XML documents.

Figure 7:
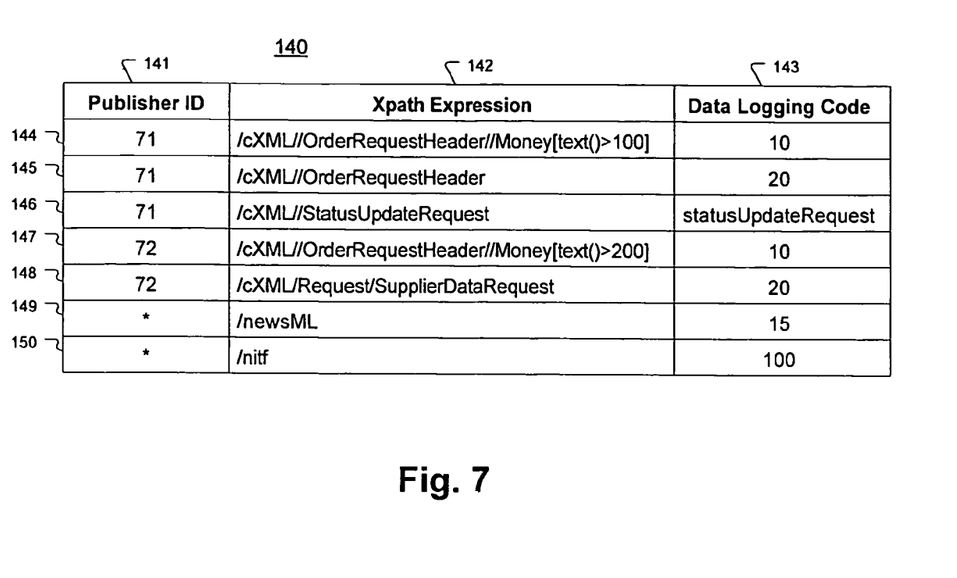
FIG. 7 shows an example ingress data logging filter table.

FIG. 7 shows an example of an ingress data logging filter table 140 containing a plurality of ingress data logging filter rules 144 through 150. Each rule has an associated publisher ID 141, which may be a unique number identifying the publisher, or the publisher user name, or any other technique which can match a publisher of a document. A special value of "*" serves as a wildcard to match all publishers. The XPath expression 142 contains the rule used to match against the content of the received document. The data logging code 143 contains a string, which could be alphanumeric, which is the output associated with the rule. In the example table 140, publisher ID "71" has three matching rules 144, 145 and 146; publisher ID "72" has two matching rules 147 and 148; and rules 149 and 150 are active for all publishers (including publisher ID "71" and "72"). Note that more than one rule can match at the same time against the contents of a published document. For example, if a document is received from publisher ID "71" whose contents match the XPath expression "/cXML//OrderRequestHeader//Money[text( )>100]", then the ingress data logging filter rules 140 will produce two data logging codes as output: "10" (from rule 144) and "20" (from rule 145) since both rules apply to publisher ID "71" and both match the contents of the published document.

The ingress record 80 can be augmented to carry zero or more codes, each code entry resulting from a match from table 140 as described above. In the above example, the following output would be part of the ingress record 80. Note that zero or more codes can be associated with an ingress record.
<code>10</code>
<code>20</code>

Figure 8:
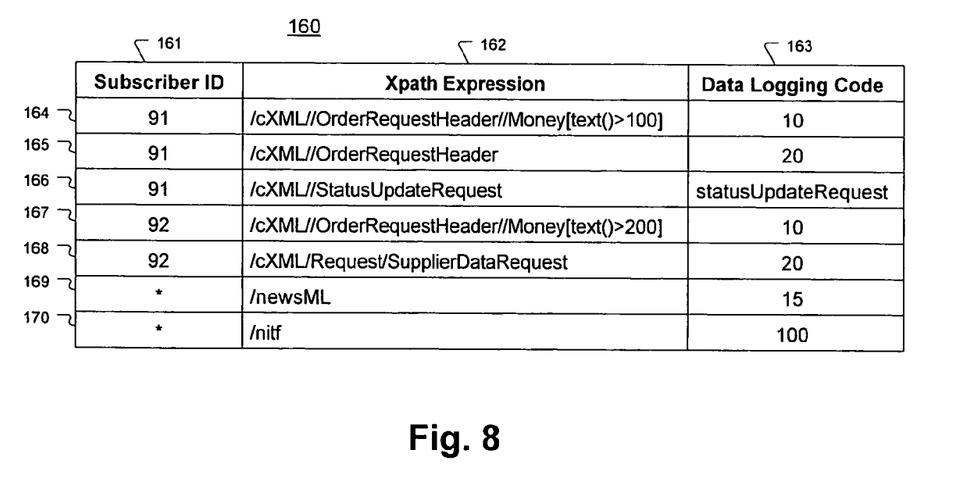
FIG. 8 shows an example egress data logging filter table.

FIG. 8 shows an example egress data logging filter table 160. In table 160, data logging filter rules are associated with subscribers, allowing codes to be generated based on the content of the document being delivered to a subscriber. Each table entry is associated with a subscriber ID 161, which may be a unique number reflecting a subscriber, or the username of the subscriber, or any other method of uniquely identifying subscribers. The Xpath expression 162 indicates the rule to be used to match against the document content, and the data logging code 163 indicates the value to be returned when the rule matches. The subscriber id 161 can be "*", which indicates a wildcard that matches all subscribers. In the example table 160, the matching rules are 164 through 170, where rules 164, 165 and 166 apply to subscriber ID "91", rules 167 and 168 apply to subscriber ID "92", and rules 169 and 170 are wildcard rules that apply to all subscriber IDs (including "91" and "92").

As an example, when a document that matches the XPath expression "/cXML//StatusUpdateRequest" is to be delivered to a subscriber with subscriber ID "91", rule 166 will match. As a result, the egress record 100 will also contain a "code" element as shown below. Note that zero or more code elements can be part of an egress record.
<code>statusUpdateRequest</code>

Additionally, the data associated with the matching table 160 can also be optionally sent to the subscriber as meta-data associated with the document being delivered, as per Ser. No. 11/012,168. This can provide extra information to the subscriber receiving the document, allowing the subscriber to use the associated code data to more efficiently process the received document, such as relaying the document to the correct processing subsystem or application.

Table 160 can simply be an extension of the local subscription table that is already maintained for all local subscribers (refer to Ser. No. 11/012,113) or it can be a completely separate table. In the case where it is part of the subscription table, the Subscribe Request document described in Ser. No. 11/012,113 can be extended to carry a code 163 with each subscription. The local subscription table can then serve to both match published documents against the subscriptions of local subscribers, and to produce data logging codes 163 for placement in egress records 100, as well as to provide the code(s) to the subscriber along with the document that matched one or more subscriptions. If different applications on the subscriber machine are using different subscriptions, the code can service to indicate which subscription has matched, and the subscriber machine can direct the document to each interested application-based on the code(s) sent by the content router along with the document.

Figure 9:
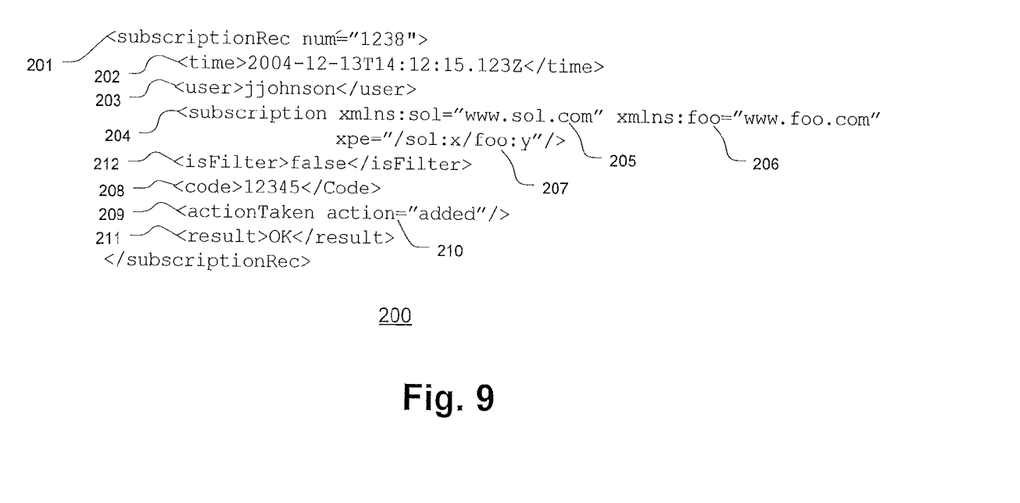
FIG. 9 shows an example subscription record.

The data logging mechanism described above can be extended to capture other events occurring in the content-routed network, especially those to which billing may be involved or to aid in the debugging of the content-routed network. For example, a new record type for subscription add or delete can be added, and this record can be generated each time a subscriber adds or deletes a subscription. An example of such a record 200 is shown in FIG. 9. In FIG. 9, the "subcriptionRec" field 201 indicates that this record relates to a subscription add or remove. The "time" field 202 contains the timestamp for the subscription add or delete event; the format of the timestamp has been described above. The "user" field 203 provides the username of the subscriber for which the subscription has been added or removed. The "subscription" field 204 indicates the Xpath expression of the subscription that is being added or removed, along with any associated namespace definitions. For a description of XML namespaces, refer to "Namespaces in XML 1.1", W3C Recommendation 4 Feb. 2004, World Wide Web Consortium (W3C), the contents of which are incorporated herein by reference. In this example the "xpe" attribute 207 contains the subscription "/sol:x/foo:y"; "sol" is a namespace prefix defined in attribute 205, where the "sol" prefix is mapped to namespace "www.sol.com"; "foo" is a namespace prefix defined in attribute 206; where the "foo" prefix is mapped to namespace "www.foo.com". Note that the xpe 207 may use zero or more namespace prefixes. The optional "isFilter" element 212 indicates whether the subscription 204 is a subscription filter (value of true) or a normal subscription (value of false). If not present, a value of false (not a filter) is assumed. The "code" element 208 indicates the code that is associated with the subscription, as explained above; this field is optional. The "actionTaken" field 209 has an attribute "action" 210 which indicates the action being logged; the "action" attribute 210 can have a value of "added" or "deleted" to indicate whether the record 200 is recording a subscription add event or a subscription delete event respectively. The "result" field 211 contains the result of the operations requested by the user and can have a value of "OK" or some error code indicating the reason for the failure. Such a record allows an external billing system to use an algorithm that includes charging a subscriber for each subscription added for example. The complexity of the xpe 207 can be factored into the charge, along with the use of a code 208. The timestamp 202 of the add event, and a possible later delete event, allows the duration of the subscription being present to be determined.

The above data logging method provides great flexibility in logging records which can be used to debug what is occurring in a content-routed network, to bill publishers and subscribers for use of the content routed network, and to monitor service level agreement parameters such as the delivery latency across the content-routed network, and the variation in latency in the delivery of a published document to a set of subscribers which receive the document.

A publisher can be charged based on factors such as the number of documents published (determined by the number of ingress records 80 associated with a given publisher username 89), the volume of data published (based on the "size" field 86), the priority of documents carried by the network, based on the "priority" field 87, whether or not "userData" was carried with the document, based on the presence of field 93, and also possibly on the size of the user data 94, based on the time of day (via timestamp 83), and based on whether a secure channel was used or not (via "security" field 79). Publishers can also be charged based on the action 92 and the associated reason 96 or reasonCode 99. Additionally, ingress records 80 and regress records 100 can be correlated based on the unique document ID 84 and 103 as described above. This allows for the possibility of the publisher to be further charged based on factors such as the number of documents published by the publisher delivered to subscribers, the total volume of data published by the publisher delivered to subscribers, etc. Moreover, codes 143 can be used to determine the type of document published, and this can lead to different types of charges to the publisher.

Similarly, subscribers can be charged based on their usage of the content routed network, based on the number of subscriptions and their complexity, using the subscription record 200 and based on data from the egress record 100 and possibly correlated with the ingress record 80. For example, a given subscriber (indicated by the subscriber username 108), can be charged based on the number of documents received (via a count of the egress records 100 for the subscriber) and/or the total volume of data received (through the sum of the size 104 of egress records 100 for the subscriber); based on the document priority (field 105), time of day (via timestamp 115), and based on whether a secure channel was used or not (via "security" field 119); and through correlation with ingress records based on the document ID 115, can be further charged based on which publisher the published document came from. The subscriber can also be charged for other services, possibly on a per-use basis, such as the filtering of documents due to a subscriber filter, as indicated by action 111 and reason 113 (or reasonCode 117) of the egress record 100. The subscriber can also be charged for delivery of the user data 106, as well as for delivery of codes 163 as explained above. Moreover, codes 163 can be used to determine the type of document delivered, and this can lead to different types of charges to the subscriber.

The content router allows for data logging to be enabled or disabled on a per-publisher basis and on a per-subscriber basis. This is done via management commands, such as via a command line interface or via Simple Network Management Protocol (SNMP), or through a graphical user interface etc. Disabling of record generation for publishers or subscribers who will not be charged based on their content can reduce the total volume of data logged. Even if not used for billing purposes, logging is also useful for debugging, and thus may be enabled always, or may be enabled on demand to debug a problem with a given publisher or subscriber.

For very high volume applications, such as publish/subscribe dissemination of financial market data (e.g. stock quotes), it may be impractical to emit ingress and egress records for every stock quote published and delivered. In such cases, the logging system can be modified to emit a summary ingress record for a given publisher, for example on a 15 minute interval basis, and a summary egress record for a given subscriber, again on an interval basis such as 15 minutes. Such summary records lose details about the disposition of each individual document, but can still maintain useful information for billing purposes and other statistical purposes.

Figure 10:
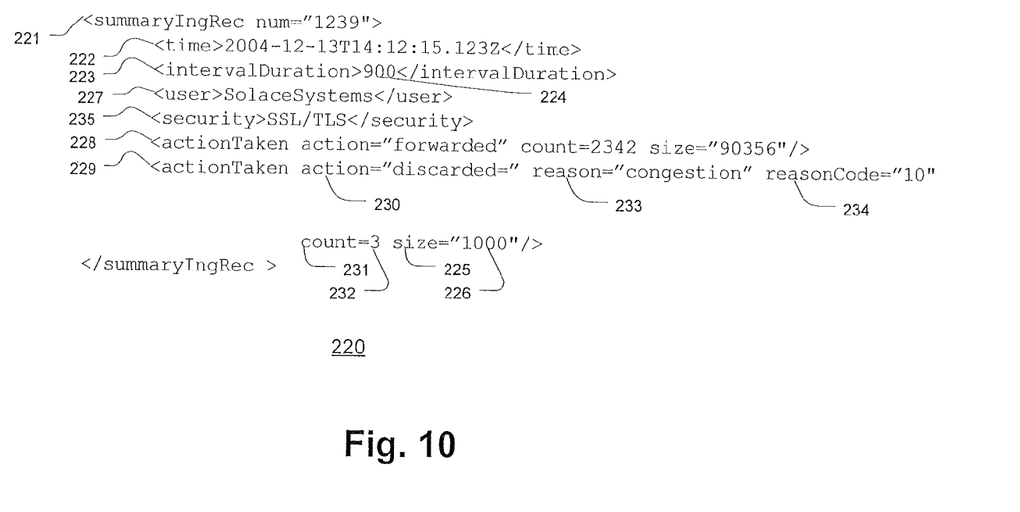
FIG. 10 shows an example summary ingress record.
Figure 11:
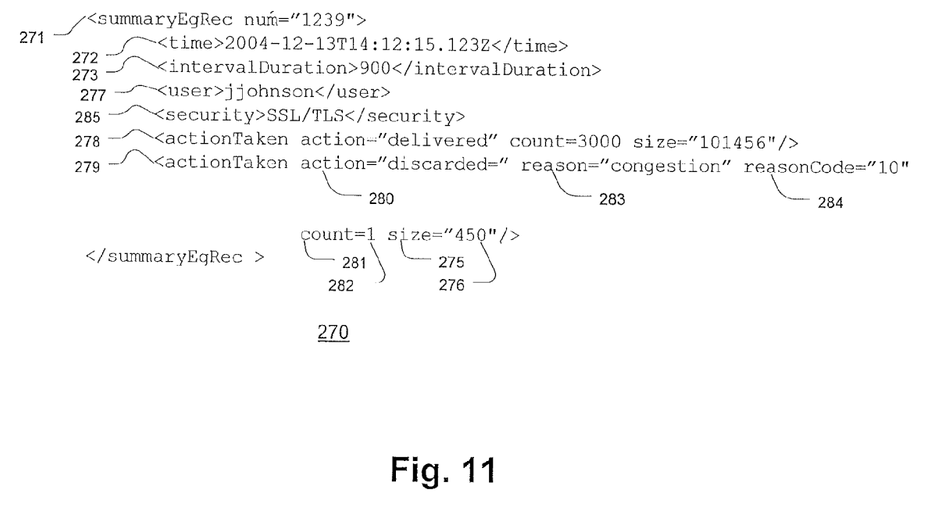
FIG. 11 shows an example summary egress record.

An example summary ingress record 220 is shown in FIG. 10. The "summaryIngRec" field 221 indicates the record type as being a summary ingress record. The "time" field 222 contains the timestamp of the end of the interval duration (when the record was produced), field "intervalDuration" 223 indicates the interval duration is seconds (for example field 224 has a value of 900, which indicates 900 seconds or 15 minutes), and field "security" 235 as described above for field 79. There can be a plurality of "actionTaken" fields, such as 228 and 229, each of which indicates:

A unique action 230, along with an optional reason 233 and reason code 234 as explained earlier (refer to Table 1);

A count attribute 231 which indicates the number of published documents 232 from user 227 which had the specified action 230 and reason 233/234 applied to them;

A size attribute 225 which indicates the total size in bytes 226 of published documents from user 227 which had the specified action 230 and reason 233/234 applied to them;

Using similar techniques, a summary egress billing record 270 can be utilized, as shown in FIG. 11. The "summaryEgRec" field 271 indicates the record type as being a summary egress record. The "time" field 272 contains the timestamp of the end of the interval duration (when the record was produced), field "intervalDuration" 273 indicates the interval duration is seconds, and field "security" 285 as described above for field 119. There can be a plurality of "actionTaken" fields, such as 278 and 279, each of which indicates:

A unique action 280, along with an optional reason 283 and reason code 284 as explained earlier (refer to Table 2);

A count attribute 281 which indicates the number of documents 282 for user (subscriber) 227 which had the specified action 280 and reason 283/284 applied to them;

A size attribute 275 which indicates the total size in bytes 276 of documents for user 227 which had the specified action 280 and reason 283/284 applied to them.

The summary ingress record 220 and summary egress record 270 can further be expanded by including summarized counts per data logging code 143 (ingress) and 163 (egress) which can be further used for billing or surveillance based on the type of document and/or the content of the document. Additionally, by using meta-data along with the document (as per Ser. No. 11/012,168) to allow the publisher of a given document to be known at each egress router, the summary egress record 270 can also provide summarized information per publisher, to allow the subscriber to be billed based on traffic received from various publishers (i.e. traffic from a given publisher may be charged differently from traffic received from a different publisher). Another method of doing this function is to summarize traffic based on the entitlement group of the document, so that a subscriber can be charged based on the volume of traffic delivered to the subscriber from each entitlement group.

A combination of techniques can be utilized. The choice of detailed vs. summary ingress and egress records can be configured on a per-publisher and per-subscriber basis. Or, the type of record to be generated could be based on the type of content published or delivered, using a filter to determine the record treatment. For example, for stock quotes using a outermost XML element of "mddl", a filter rule can be defined to indicate that published documents matching "/mddl" should use summary ingress record techniques, and otherwise a detailed ingress record should be instead produced. A similar filter can be applied before delivery to a subscriber to determine whether a summary egress record or a detailed egress record should be produced.

Another option when using summary ingress 220 and egress 270 records is to produce a detailed record (ingress 80 and egress 100) for a small percentage of documents, such as 1 in every 1000 documents. The selected document would still be included in the summary ingress 220 and egress 270 records. The detailed record (ingress 80 and egress 100) would be used to measure delivery latency from the publisher to each subscriber who received the document on a sampled basis. In order to ensure that a selected document for a detailed ingress records 80 also has an egress record 100 generated for each copy delivered to various subscribers, the ingress router would attach a meta-data item to the document to indicate that a detailed record 100 is to be produced by each egress router. This special meta-data would be removed before delivery of the document to any subscribers, as explained in Ser. No. 11/012,168.

It will be appreciated that an exemplary embodiment of the invention has been described, and persons skilled in the art will appreciated that many variants are possible within the scope of the invention.

All references mentioned above are herein incorporated by reference.

We claim:

1. A method of managing a content routed network, wherein documents are introduced into the network by publishers and routed through the network for delivery to subscribers with subscriptions matching the content of said documents by content routers, said method comprising:

said publishers introducing documents into said network at edge routers serving as ingress routers for said documents;

upon arrival of a particular document at an ingress router, creating a record in memory that is associated with that document;

matching said particular documents against any local subscriptions associated with the ingress router and any remote subscriptions associated with a remote said router;

delivering said document to any local subscribers having matching local subscriptions;

routing said document to one or more remote said routers with matching subscriptions and serving as egress routers for said document;

assigning a unique identifier to the each incoming document at the ingress router;

for each document arriving at the ingress router, creating an ingress record containing the name of the publisher and the time of arrival of the document at the ingress router and a series of ingress records containing information about the result of at least said subscriber matching operations performed thereon at the ingress router, wherein each record is associated with said unique identifier assigned to the incoming document at the ingress router;

writing the ingress records to a current traffic logging file in memory at the ingress router;

performing a series of operations on each document at an identified remote router serving as an egress router including matching subscriptions to identify subscribers at the egress router entitled to delivery of the document;

delivering said documents to subscribers with matching subscriptions for said document at said egress router;

for each document received at a said egress router, creating an egress record containing the time of delivery when each document is delivered to a subscriber and a series of egress records containing information about the results of at least subscriber matching operations performed at the egress router, each egress record containing said unique identifier for that document that is assigned at the ingress router for that document;

writing the egress records with said unique document identifiers to a current traffic logging file at the egress router;

for each document delivered to a local subscriber at the ingress router, creating an egress record containing the time of deliver when each document is delivered to a subscriber and a series of egress records containing information about the results of at least subscriber matching operations performed at the ingress router, each egress record at the ingress router containing said unique identifier for that document;

writing the egress records at the ingress router to the traffic logging file at the ingress router;

closing the current traffic logging files at the ingress and egress routers when a predetermined condition is met;

transferring the closed traffic logging files from the ingress and egress routers to a processing system;

and said processing system correlating said ingress and egress records in said traffic logging files to provide information about the distribution of said documents and the performance of said network.

2. The method of claim 1, wherein said processing system examines said ingress records containing the time of arrival at the ingress points and the egress records containing the time of delivery to said matching subscribers to determine delivery latency of said published document for each subscriber receiving said document.

3. The method of claim 1, wherein the published documents are provided with user data assigned by respective publishers, and said user data are recorded in ingress records, and wherein said user data are carried through the network with the documents and recorded in egress records when the published documents are delivered to each subscriber at various points in the network.

4. The method of claim 1 wherein archived log files are stored in memory at the content router.

5. The method of claim 4, wherein said archived log files are sent automatically to a remote server.

6. The method of claim 5, wherein said remote server is an SFTP server.

7. The method of claim 1, wherein said predetermined condition is selected from the group consisting of: its size reaches a configurable threshold; a configurable amount of time has elapsed since the file was created; and the file reaches a configurable number of record entries.

8. The method of claim 1, wherein said published documents pass through different networks, and records are stored in routers at a boundary between said different networks.

9. The method of claim 8, wherein an egress record is created at the network boundary as a document leaves one network for another network.

10. The method of claim 8, wherein an ingress record is created as the document arrives at one network after leaving another network.

11. The method of claim 9, wherein the egress record indicates the identity of the content routed network to which the document is being sent.

12. The method of claim 10, wherein the ingress record indicates the identity of the content routed network from which the document is received.

13. The method of claim 1, wherein said published documents pass between nodes in a single administrative domain and records are stored at each node.

14. The method of claim 13, wherein an egress record is created at a node as a document leaves that node for another node.

15. The method of claim 13, wherein an ingress record is created as the document arrives one node after leaving another node.

16. The method of claim 14, wherein the egress record indicates the identity of the node to which the document is being sent.

17. The method of claim 15, wherein the ingress record indicates the identity of the node from which the document is received.

18. The method of claim 1, wherein said ingress and egress records are formatted using a markup language.

19. The method of claim 1, wherein an egress record is generated when a document cannot be immediately delivered to the matching subscriber.

20. The method of claim 18, wherein the ingress records are of the form:

```
<ingRec num="">
    <time></time>
    <docId></docId>
    <size></size>
    <pri></pri>
    <userData></userData>
    <user></user>
    <security> </security>
        <actionTaken action="" reason="" reasonCode=""/>
</ingRec>.
```

21. The method of claim 18, wherein the egress records are of the form:

```
<egRec num="">
    <time></time>
    <docId> </docId>
    <size></size>
    <pri></pri>
    <userData></userData>
        <user> </user>
    <security> </security>
    <actionTaken action="" reason="" reasonCode=""
            ack=""/>
</egRec>.
```

22. The method of claim 1, wherein data logging filters are provided so that the content of the published documents are reflected in the ingress and egress records.

23. The method of claim 22, wherein said data logging filters comprise rules associated with specific publisher identities or a wildcard publisher identity.

24. The method of claim 22, wherein said data logging filters comprise rules associated with specific subscriber identities or a wildcard subscriber identity.

25. The method of claim 1, wherein for high volume applications summary records associated with a specific concept are created at intervals.

26. The method of claim 25, wherein said specific concept is selected from the group consisting of: a publisher, a subscriber, an entitlement group, content published and content delivered.

27. The method of claim 25, wherein said summary records include ingress and egress records.

28. The method of claim 25, wherein in addition to the summary records detailed records are created for a small percentage of documents processed.

29. The method of claim 1, wherein a subscription record is generated as subscriptions are added or deleted.

30. The method of claim 29, wherein the subscription records included a field containing the username of the subscriber for which the subscription has been added or removed and optionally zero or more fields from the group consisting of: timestamp, subscription, filter flag, code, action taken, and result.

31. The method of claim 30, wherein billing information is derived from said subscription records.

32. A content routed network wherein documents are introduced into the network by publishers and routed through the network for delivery to subscribers with subscriptions matching the content of said documents by content routers, said content routed network comprising:

a plurality of edge content routers and a processing system, each edge content router comprising:

a central processing unit;

a first memory portion storing programs and data; and a second memory portion storing records of published content passing through the content router, and wherein said central processing unit at an edge router serving as an ingress router is configured to:

upon arrival of a particular document, create a record in memory that is associated with that document;

assign a unique identifier to the each incoming document;

match said particular documents against any local subscriptions associated with the ingress router and any remote subscriptions associated with a remote said router;

deliver said document to any local subscribers having matching local subscriptions;

route said document to one or more remote said routers with matching subscriptions and serving as egress routers for said document using a content-based routing scheme;

for each incoming document arriving at the ingress router, create an ingress record containing the name of the publisher and the time of arrival of the document and a series of ingress records containing information about the result of at least said subscriber matching operations performed thereon at the ingress router, wherein each record is associated with said unique identifier assigned to the incoming document arriving at said edge router serving as the ingress router;

write the ingress records to a current traffic logging file in the second memory portion; and forward said documents through the network to one or more remote routers serving as an egress router for that document; and wherein the central processing unit at the one or more remote routers serving as an egress router is configured to match subscriptions to identify subscribers entitled to delivery of the document;

for each outgoing document create an egress record containing the time of delivery when each document is delivered to a subscriber and a series of egress records containing information about the results of each operation performed on the outgoing document, each egress record containing the unique identifier for that document that is assigned at the edge router serving as the ingress router for that document;

write the egress records with said unique document identifiers to a current traffic logging file in the second memory portion;

wherein the central processing unit at the router serving as the ingress router is further configured for each document delivered to a local subscriber at the ingress router, to create an egress record containing the time of delivery when each document is delivered to a subscriber and a series of egress records containing information about the results of at least subscriber matching operations performed at the ingress router, each egress record at the ingress router containing said unique identifier for that document;

write the egress records at the ingress router to the traffic logging file at the ingress router;

and wherein the central processing units at the routers serving as the ingress router and egress router are further configured to:

close the current traffic logging file when a predetermined condition is met; and transfer the closed traffic logging file to the processing system for correlating said ingress and egress records in said traffic logging files to provide information about the performance of said network.

33. The content routed network of claim 32, wherein said processing system correlates the records by comparing the time of arrival and time of delivery of documents to determine network latency.

34. The content routed network of claim 33, wherein the edge content routers a create ingress records logging documents received from particular publishers and egress records logging documents delivered to particular subscribers.

35. The content routed network of claim 34, wherein the content routers are configured to create an egress record for a particular document when a matching subscriber is found.

36. The content routed network of claim 34, wherein the content routers are configured to provide published documents with user data assigned by respective publishers so that said user data are recorded in ingress records, carried through the network with the documents, and recorded in egress records when the published documents are delivered to each subscriber at various points in the network.

37. The content routed network of claim 34, wherein said content routers include data storage devices for storing archived log files.

38. The content routed network of claim 37, wherein content routers are configured to send the archived log files automatically to a remote server.

39. The content routed network of claim 37, wherein said predetermined condition is selected from the group consisting of: its size reaches a configurable threshold; a configurable amount of time has elapsed since the file was created; and the file reaches a configurable number of record entries.

40. The content routed network of claim 32, which is connected to a different network, and wherein said content routers at the boundary between the different networks are configured to store data records at the boundary as documents pass between the networks.

41. The content routed network of claim 32, where said content routers further comprise data logging filters so that the content of the published documents is reflected in the ingress and egress records.

42. The content routed network of claim 41, where said data logging filters comprise rules associated with specific or wildcard publisher identities or specific or wildcard subscriber identities.

* * * * *